July 9, 1957   M. T. POPOVICH ET AL   2,798,898
BUS DUCT CONSTRUCTIONS
Filed March 23, 1953
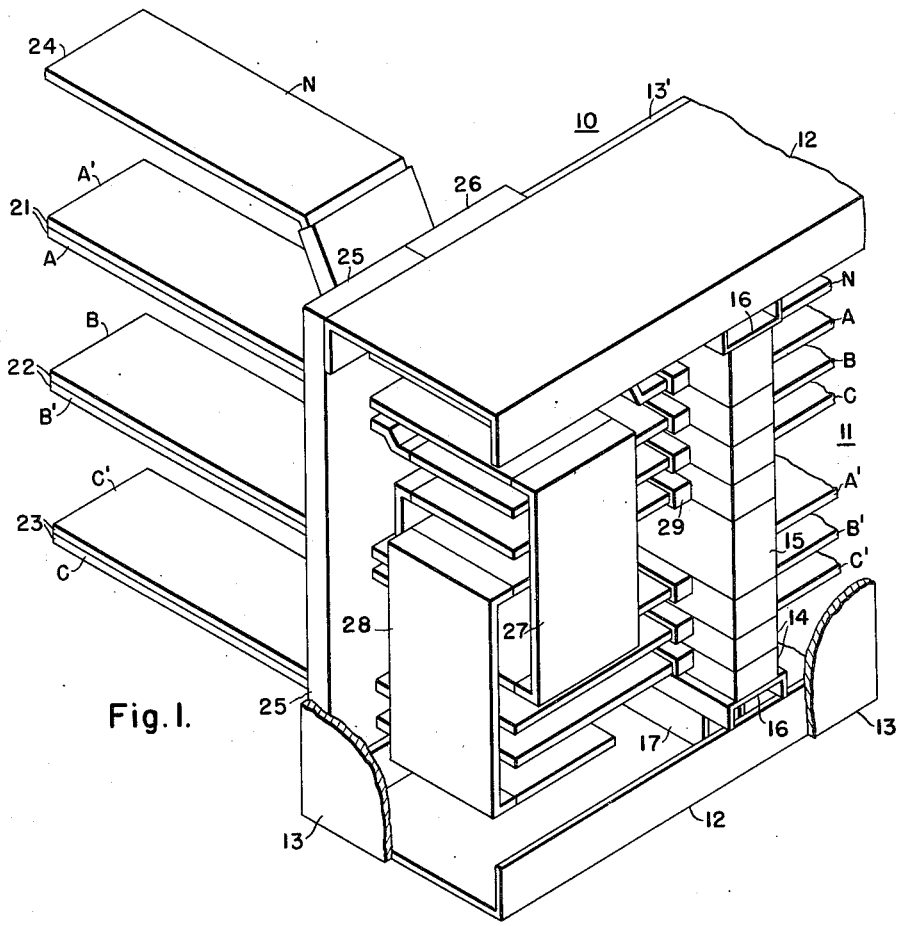
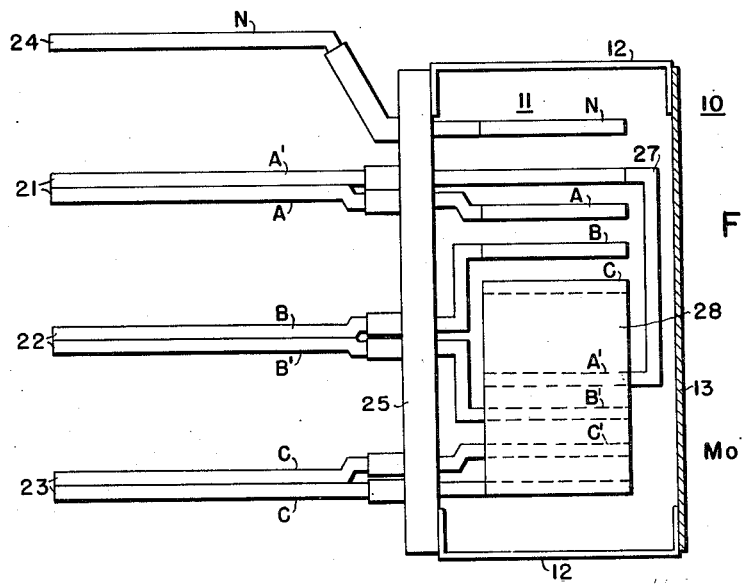
INVENTOR
Montgomery T. Popovich
and Louis N. Ricci
BY
ATTORNEY

United States Patent Office 2,798,898
Patented July 9, 1957

2,798,898

BUS DUCT CONSTRUCTIONS

Montgomery T. Popovich and Louis N. Ricci, Beaver Falls, Pa., assignors to Westinghouse Electric Corporation, East Pittsburgh, Pa., a corporation of Pennsylvania Application March 23, 1953, Serial No. 344,036

8 Claims. (Cl. 174—72)

Our invention relates, generally to bus duct for electrical distribution systems and, more particularly, to phase connections for multi-phase bus duct structures.

When installing bus duct, particularly low impedance duct, it is frequently necessary to connect the bus duct to transformers or switchgear apparatus having phase connections arranged differently from the phase bus bars in the bus duct. Thus it becomes necessary to regroup or transpose the phase bars in the bus duct in order that the electrical connections can be made.

An object of our invention, generally stated, is to provide a bus duct structure which shall be simple and efficient in operation and which may be economically manufactured and installed.

A more specific object of our invention is to provide for transposing the phase bars in a bus duct structure.

Another object of our invention is to provide a unit for connecting bus duct to a transformer or switchgear apparatus.

A further object of our invention is to simplify and strengthen the structure of a unit for transposing phase bars in bus duct.

Other objects of our invention will be explained fully hereinafter or will be apparent to those skilled in the art.

In accordance with one embodiment of our invention, a pair of juxtaposed conductors for each phase of a three-phase system enter a bus duct housing section and two sets of conductors leave the housing section with each set containing one conductor for each phase. Two of the juxtaposed conductors are connected to corresponding phase conductors by U-shaped tie bars which are disposed in perpendicularly intersecting planes. The remaining juxtaposed conductors are connected directly to corresponding phase conductors within the housing section.

For a better understanding of the nature and objects of the invention, reference may be had to the following detailed description taken in conjunction with the accompanying drawing, in which:

Figure 1 is an isometric view of a portion of a bus duct structure embodying the principal features of the invention; and Fig. 2 is a view, partly in elevation and partly in section, of the structure shown in Fig. 1.

Referring to the drawing, the bus duct structure shown therein comprises a housing section 10 inside of which are disposed two sets of three-phase bus bars 11. As shown the housing 10 comprises spaced channel members 12 to which side plates 13 and 13' are attached. The side plate 13 has an angle bend therein to enclose one end of the structure. The housing may be of a type well-known in the art and it is believed unnecessary to describe it in further detail in the present application.

The corresponding phases of the two sets of bus bars are designated A, B, C and A', B', C'. A neutral bar N may be disposed above the one set of phase bars or, if desired, it may be disposed between the two sets of phase bars. The bus bars of each set are spaced relatively close together in order to reduce the reactance of the system.

The bus bars are supported by insulating blocks 14 and 15 which are assembled on the bus bars in contiguous relation and maintained under compression by tie bolts (not shown) which extend through the supporting blocks from a channel 16 at the top to a similar channel 16 at the bottom of the blocks. Channel members 17 may be welded to top and bottom channels 12 of the housing to cooperate with the channels 16 in preventing longitudinal movement of the bus bars. The manner of supporting the bus bars is fully described in the copending application of L. W. Dyer and W. F. Born, Serial No. 71,584, filed January 19, 1949, now Patent No. 2,653,991.

As explained hereinbefore, it is frequently necessary to connect the phase conductors of a bus duct system to taps of a transformer or to power conductors in switchgear apparatus which are spaced and arranged differently from the phase conductors in the bus duct structure. Thus, it is necessary to provide for regrouping or transposing the phase conductors in order that the necessary electrical connections can be made.

As shown in the present drawing, two juxtaposed conductors are provided for each phase of the three-phase system. Thus, two conductors 21 are provided for phase A, conductors 22 for phase B and conductors 23 for phase C. A neutral conductor 24 is provided for the neutral connection. It will be understood that these conductors may be connected to the proper taps of a three-phase transformer or to other sources of three-phase power.

As shown, the juxtaposed conductors enter the side of the housing section 10 at right angles to the phase conductors 11. The conductors 21 to 24 inclusive are supported by insulating barriers 25 and 26 which may be attached to the channels 12 of the housing 10.

In order to secure the desired phase relationship between the conductors, a tie bar 27 connects the upper conductor 21 to the phase conductor A' of the lower set of phase conductors in the housing 10. Also, a tie bar 28 connects the lower conductor 23 to the phase conductor C of the upper set of conductors in the housing 10. The lower conductor 21 is connected directly to the phase conductor A in the housing 10. The conductors 22 are connected directly to phase conductors B and B', respectively. The upper conductor 23 is connected directly to the phase conductor C'. Thus, the proper phase relationship of the conductors is obtained.

As shown, the tie bars 27 and 28 are generally of a U-shape. The width and the thickness of each tie bar are substantially the same as the width and thickness of one of the bus bars, thereby having the same current carrying capacity as a bus bar. The ends of the tie bars may be brazed to the proper edges of the bus bars, thus forming an intermolecular bond therewith. Likewise, the edges of the bus bars which are connected directly to each other may be brazed together.

The tie bars 27 and 28 are disposed in planes which intersect perpendicularly. Thus, one bar may overlap the other, thereby making it possible to make the necessary electrical connections between the juxtaposed conductors and the spaced phase conductors without increasing the size of the duct housing 10 above the size normally supplied for housing the phase conductors 11. Furthermore, the supporting blocks 14 and 15 may be located relatively close to the ends of the conductors 11 to provide the necessary support for the conductors. As shown, an insulating sleeve 29 may be provided on each conductor between the conductor and its supporting members.

From the foregoing description it is apparent that we have provided for transposing or regrouping the phase conductors in a bus duct structure in a relatively simple manner which does not require any increase in the size of the bus duct housing above the normal size. The present connections require a minimum amount of brazed joints between power conductors, thereby reducing the cost of manufacturing and reducing possible sources of electrical trouble by eliminating some of the brazed joints required in prior structures of a similar type. Also, the mechanical strength of the structure is increased by locating the bus bar support close to the points of stress concentrations, which are great when heavy cables are used as connectors from transformer studs to bus bars.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a multi-phase bus duct, in combination, a housing section, a pair of substantially flat juxtaposed conductors for each phase entering the housing section, insulating means for maintaining said pairs of conductors in spaced relation, two sets of substantially flat conductors leaving the housing section, each set containing at least one conductor for each phase, said phase conductors in each set being in sequential relation and disposed closely together, and generally U-shaped tie bars for connecting two of said juxtaposed conductors to corresponding sequential phase conductors, said tie bars being disposed in perpendicularly intersecting planes and having their ends joined to edges of certain conductors by an intermolecular bond.

2. In a multi-phase bus duct, in combination, a housing section, a pair of substantially flat juxtaposed conductors for each phase entering the housing section, insulating means for maintaining said pairs of conductors in spaced relation, two sets of substantially flat conductors leaving the housing section, each set containing at least one conductor for each phase, said phase conductors in each set being in sequential relation and disposed closely together, and generally U-shaped tie bars for connecting two of said juxtaposed conductors to corresponding sequential phase conductors, said tie bars being disposed in perpendicularly intersecting planes and having their ends joined to edges of certain conductors by an intermolecular bond, the width of each tie bar being substantially the same as the width of one of said conductors.

3. In a multi-phase bus duct, in combination, a housing section, a pair of substantially flat juxtaposed conductors for each phase entering the housing section, two sets of substantially flat conductors leaving the housing section at right angles to the juxtaposed conductors, each set containing one conductor for each phase, said phase conductors in each set being in sequential relation, and generally U-shaped tie bars for connecting two of said juxtaposed conductors to corresponding sequential phase conductors, said tie bars being disposed in perpendicularly intersecting planes, said tie bars being joined to edges of certain conductors and to ends of other conductors by an intermolecular bond, and supporting means disposed within the housing section for supporting the conductors.

4. In a multi-phase bus duct, in combination, a housing section, a pair of substantially flat juxtaposed conductors for each phase entering the housing section, two sets of substantially flat conductors leaving the housing section at right angles to the juxtaposed conductors, each set containing one conductor for each phase, said phase conductors in each set being in sequential relation, and generally U-shaped tie bars for connecting two of said juxtaposed conductors to corresponding sequential phase conductors, said tie bars being disposed in perpendicularly intersecting planes, said tie bars being joined to edges of certain conductors and to ends of other conductors by an intermolecular bond, the remaining juxtaposed conductors being connected directly to corresponding phase conductors.

5. In a three-phase bus duct, in combination, a generally rectangular housing section, a plurality of substantially flat juxtaposed conductors entering the housing section for each phase, at least two sets of substantially flat conductors leaving the housing section at right angles to the juxtaposed conductors, each set containing at least one conductor for each phase, said phase conductors in each set being in sequential relation, and generally U-shaped tie bars for connecting part of said juxtaposed conductors to corresponding phase conductors, the ends of said tie bars being joined to edges of certain conductors by an intermolecular bond.

6. In a three-phase bus duct, in combination, a generally rectangular housing section, a plurality of substantially flat juxtaposed conductors entering the housing section for each phase, at least two sets of substantially flat conductors leaving the housing section at right angles to the juxtaposed conductors, each set containing at least one conductor for each phase, said phase conductors in each set being in sequential relation, and generally U-shaped tie bars for connecting part of said juxtaposed conductors to corresponding phase conductors, the ends of said tie bars being joined to edges of certain conductors by an intermolecular bond, the remaining juxtaposed conductors being joined directly to corresponding phase conductors by an intermolecular bond.

7. In a three-phase bus duct, in combination, a housing section, at least two substantially flat conductors for each phase entering the housing section, at least six substantially flat conductors leaving the housing section, the phase conductors entering the housing section being disposed in three groups with two conductors in each group, the phase conductors leaving the housing section being disposed in two groups with three conductors in each group, and generally U-shaped tie bars for connecting corresponding phase conductors, said tie bars being joined to edges of certain conductors and to ends of other conductors by an intermolecular bond.

8. In a multi-phase bus duct, in combination, a housing section, at least two substantially flat conductors entering the housing section for each phase, at least six substantially flat conductors leaving the housing section, the phase conductors entering the housing section being grouped with the conductors for each phase disposed closely together, the phase conductors leaving the housing section being grouped with conductors for three phases disposed closely together, and generally U-shaped tie bars for connecting certain corresponding phase conductors, each tie bar being joined to an edge of one conductor and to an end of another conductor by an intermolecular bond.

References Cited in the file of this patent

UNITED STATES PATENTS

| 2,287,502 | Togesen et al. | June 23, 1942 |
| 2,583,105 | Johansson | Jan. 22, 1952 |

FOREIGN PATENTS

| 616,851 | Germany | Aug. 6, 1935 |